United States Patent [19]

Häring

[11] Patent Number: 4,501,443

[45] Date of Patent: Feb. 26, 1985

[54] FLUIDTIGHT PIPE JOINT

[75] Inventor: Manfred Häring, Düsseldorf, Fed. Rep. of Germany

[73] Assignee: Mannesmann Aktiengesellschaft, Düsseldorf, Fed. Rep. of Germany

[21] Appl. No.: 469,384

[22] Filed: Feb. 24, 1983

[30] Foreign Application Priority Data

Feb. 27, 1982 [DE] Fed. Rep. of Germany ....... 3207182

[51] Int. Cl.³ .............................................. F16L 35/00
[52] U.S. Cl. ...................................... 285/328; 285/334
[58] Field of Search ............... 285/328, 330, 333, 334, 285/355, 390; 403/343

[56] References Cited

U.S. PATENT DOCUMENTS

| | | | |
|---|---|---|---|
| 1,935,673 | 11/1933 | Smith et al. | 285/328 |
| 2,050,137 | 8/1936 | Walsh | 285/328 X |
| 2,258,066 | 10/1941 | Oyen | 285/334 X |
| 3,856,337 | 12/1974 | Ehm et al. | 285/334 |
| 3,870,351 | 3/1975 | Matsuki | 285/334 |

FOREIGN PATENT DOCUMENTS

| | | |
|---|---|---|
| 1906009 | 5/1964 | Fed. Rep. of Germany . |
| 1525928 | 6/1970 | Fed. Rep. of Germany . |
| 1533619 | 6/1970 | Fed. Rep. of Germany . |

Primary Examiner—Dave W. Arola
Attorney, Agent, or Firm—Karl F. Ross; Herbert Dubno

[57] ABSTRACT

Two metallic pipes to be sealingly interfitted are respectively provided with a plug-shaped male extremity and a socket-shaped female extremity having mating frusto-conical peripheral threads and adjoining unthreaded annular peripheral formations closely contacting each other upon assembly. An annular end face of the male extremity and a confronting annular shoulder of the female extremity, lying in planes transverse to the pipe axis, have spiral tracks of trapezoidal profile engaging each other with close positive fit in the fully assembled position, the pitch of these tracks being such as to counter a radial compression of that end face by the interacting unthreaded peripheral formations.

8 Claims, 4 Drawing Figures

FLUIDTIGHT PIPE JOINT

FIELD OF THE INVENTION

My present invention relates to a fluidtight joint for metallic tubular members—referred to hereinafter as pipes—that are to be coaxially interfitted with the aid of male helicoidal threads on an outer peripheral surface of a plug-shaped extremity of one pipe and mating female helicoidal threads on an inner peripheral surface of a socket-shaped extremity of the other pipe.

BACKGROUND OF THE INVENTION

Such pipe joints are used, for example, in oil-well tubing to form drill strings composed of a series of pipe sections with threaded male and female extremities at opposite ends. The threaded peripheral surfaces of these extremities are usually of frustoconical shape and terminate in annular lands, namely an end face on the male extremity or plug and an inner shoulder on the female extremity or socket, abutting each other in a final position of assembly. In some instances, unthreaded annular zones in the vicinity of these lands may coact in the fully assembled position to form a tight seal therebetween; usually, the sealing zone on the inner socket surface is substantially frustoconical while the confronting zone on the outer plug surface is either convex or frustoconical.

The joints so formed are subjected to considerable stress, e.g. when used in an oil well in which pipe sections of a length of about six meters are to be assembled into a string several kilometers long. To absorb these stresses, the joint should be formed by direct metal-to-metal contact without the interposition of any more readily deformable sealing member.

According to German printed specification No. 1,533,619, for example, the annular shoulder of the socket has a smooth frustoconical surface converging toward the entrance end of that socket at a large obtuse vertex angle; the annular plug face coacting therewith is of complementary frustoconical configuration. When the two extremities are threadedly interfitted under pressure, the interengagement of these frustoconical surfaces tends to expand the plug face in a radial direction with resulting enhancement of the sealing effect between the confronting peripheral zones. the extent of this expansion, however, is determined by the relative torque applied to the two interfitted pipe sections and depends inter alia on such uncontrollable factors as surface roughness or possible irregularities and the presence of an intervening lubricant film. These considerations also apply to an assembly of the type disclosed in German printed specification No. 1,525,928 in which the shoulder of the socket is subdivided into two concentric annular regions, the outer region being frustoconical with a considerably smaller vertex angle pointing away from the entrance end of the socket. The unthreaded peripheral zone of the inner socket surface immediately adjoining the latter region is separated from the confronting unthreaded zone of the plug by a certain annular clearance into which the material of the plug may penetrate upon the radial expansion of its end face.

OBJECT OF THE INVENTION

The object of my present invention is to provide an improved joint for a pair of such pipes in which, after assembly, the internal contact pressures depend more or less exclusively and in a predetermined manner on the applied torque.

SUMMARY OF THE INVENTION

I realize this object, in accordance with my present invention, by providing the end face of the plug-shaped extremity of a first pipe and the annular shoulder of the socket-shaped extremity of a second pipe with respective spiral tracks, generally complementary to each other, for mating engagement when the end face approaches the shoulder as the two coaxial pipes are interfitted and relatively rotated with mating interengagement of their helicoidal peripheral threads. The pitch of these spiral tracks is such as to tend to expand an unthreaded peripheral zone of the plug, interposed between its male helicoidal threads and its end face, into close contact with an unthreaded peripheral zone of the socket interposed between its entrance end and its annular shoulder. As known per se, e.g. from German utility model No. 1,906,009, the unthreaded zone of the plug may be an annular bulge while that of the socket may be substantially frustoconical, thereby giving rise to a radial force tending to compress the end face of the plug. This compressive force is resisted by countervailing force, exerted by the spiral tracks, whereby both forces contribute to the establishment of a desired contact pressure between the two peripheral zones.

The spiral tracks referred to may have the shape of single or multiple threads.

It will generally be desirable to provide axial contact, in the terminal position of assembly, between the confronting annular lands of the two extremities, namely the end face of the plug and the shoulder of the socket. With the tracks defined by spiral ribs forming a plurality of turns separated by intervening multiturn grooves of generally complementary—preferably trapezoidal—profile, this axial contact will be established between the top of a rib on one land and the bottom of a groove on the other land. Advantageously, with ribs of the same axial height on both lands, that contact will be mutual. Reference in this connection may be made to a commonly owned application, Ser. No. 469,382, filed concurrently with my present application by Wolfgang Heilmann et al. According to the disclosure of that concurrently filed application, the end face of the plug and the shoulder of the socket have concentric rather than spiral ribs and grooves coming into such axial contact upon final assembly.

When the profiles of the ribs and grooves are substantially trapezoidal, the radially outer flanks of these profiles—which in the assembled position come into close contact with one another—are preferably parallel to the axes of the respective pipes. Such a profile facilitates the interfitting of the spiral tracks in the last phase of assembly during which the end face of the plug undergoes a certain radial compression as noted above. In countering that radial compression, the interengaging spiral threads help center the two extremities relatively to each other and, in particular, serve to align the generatrices of the inner wall surfaces of the two pipes for a smooth transition between them; this is important from a hydraulic viewpoint when the pipes are used for the conveyance of oil or other liquids.

BRIEF DESCRIPTION OF THE DRAWING

The above and other features of my invention will now be described in detail with reference to the accompanying drawing in which.

SPECIFIC DESCRIPTION

Figure 1:
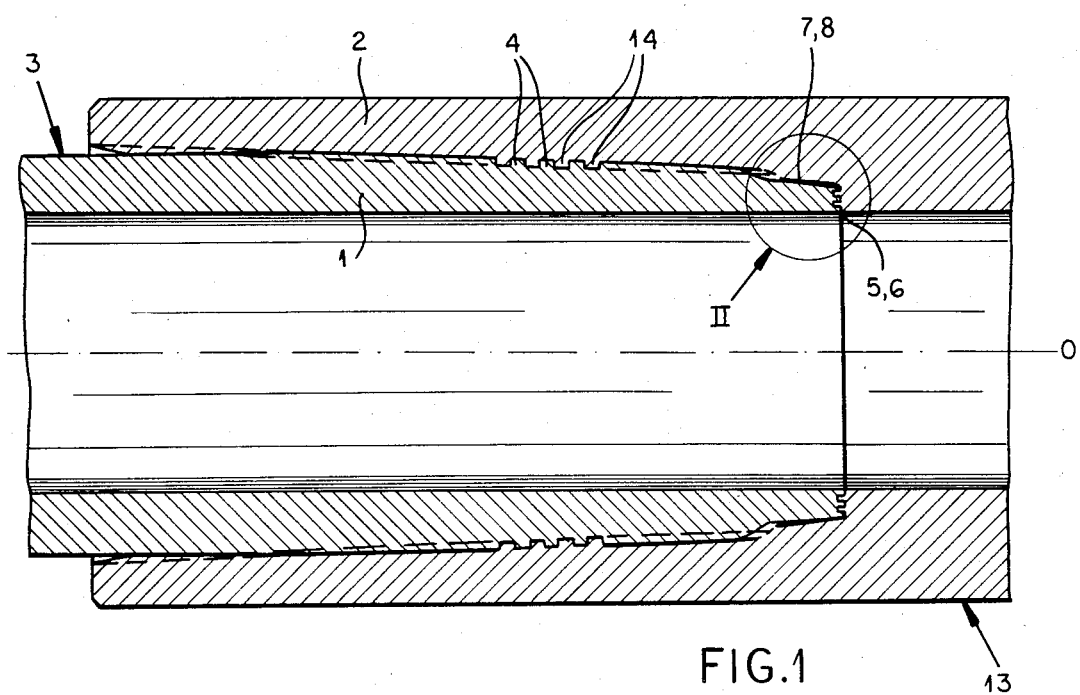
FIG. 1 is a longitudinal sectional view of interfitted male and female extremities of respective metallic pipes in accordance with my present invention.
Figure 3:
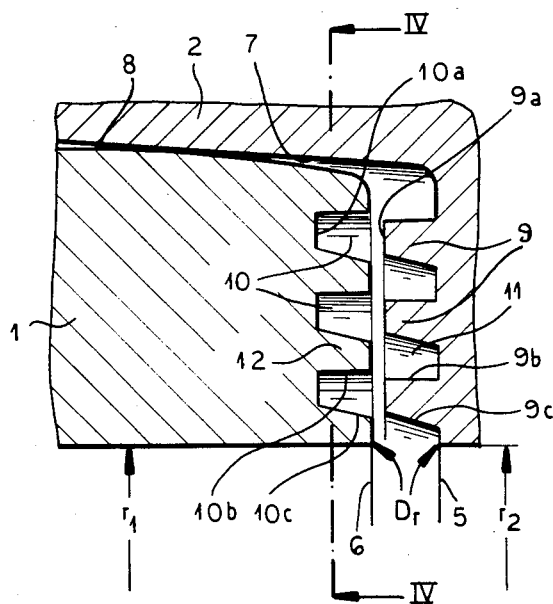
FIG. 3 is a view similar to FIG. 2, showing the two pipe extremities in a position preceding the last phase of assembly.
Figure 2:
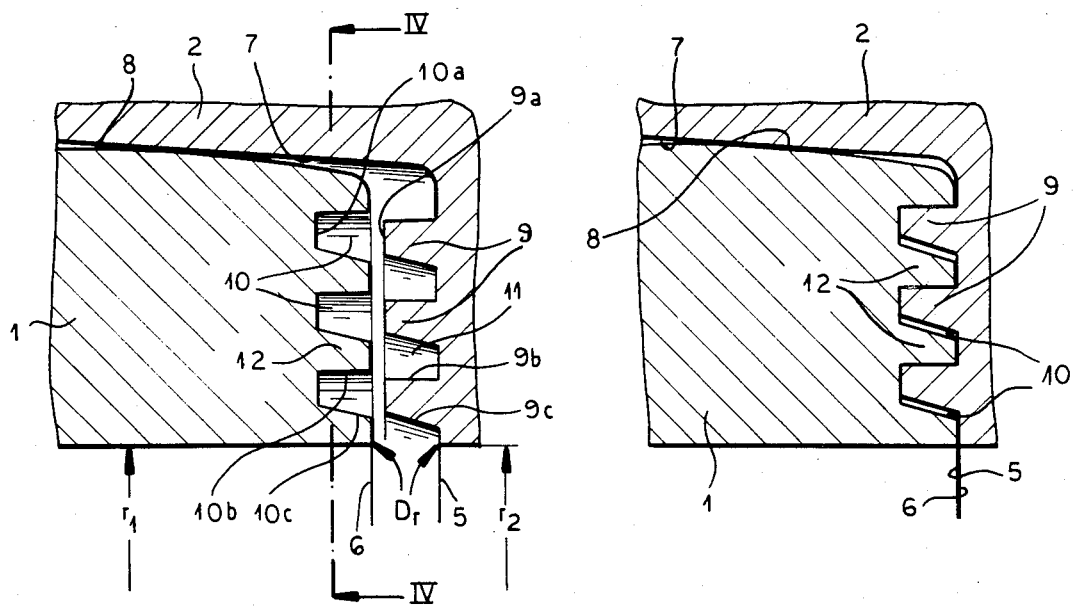
FIG. 2 is an enlarged sectional view of a detail marked by a circle II in FIG. 1.

FIGS. 1-3 show interfitted extremities of two coaxial pipes illustrated only in part, namely a plug 1 at an end of a pipe 3 and a socket 2 at an end of a pipe 13. Plug 1 has a generally frustoconical outer peripheral surface with male helicoidal threads 4 matingly engaging female helicoidal threads 14 on a generally frustoconical inner peripheral surface of socket 2. Plug 1 terminates in a transverse annular end which, in the assembled position of FIGS. 1 and 2, abuts an annular shoulder 5 of socket 2. Shoulder 5 is separated from threads 14 by an unthreaded frustoconical peripheral zone 7 which is in close contact with an unthreaded annular bulge 8 lying between threads 4 and end face 6 of plug 1. The radial width of the two annular lands 5, 6, which may be approximately 5 mm, has been greatly exaggerated in FIGS. 2-4 for the sake of clarity; it should also be noted that in FIG. 4 the proportion between that width and the inner pipe diameter differs for the same reason from that of FIG. 1.

Figure 4:
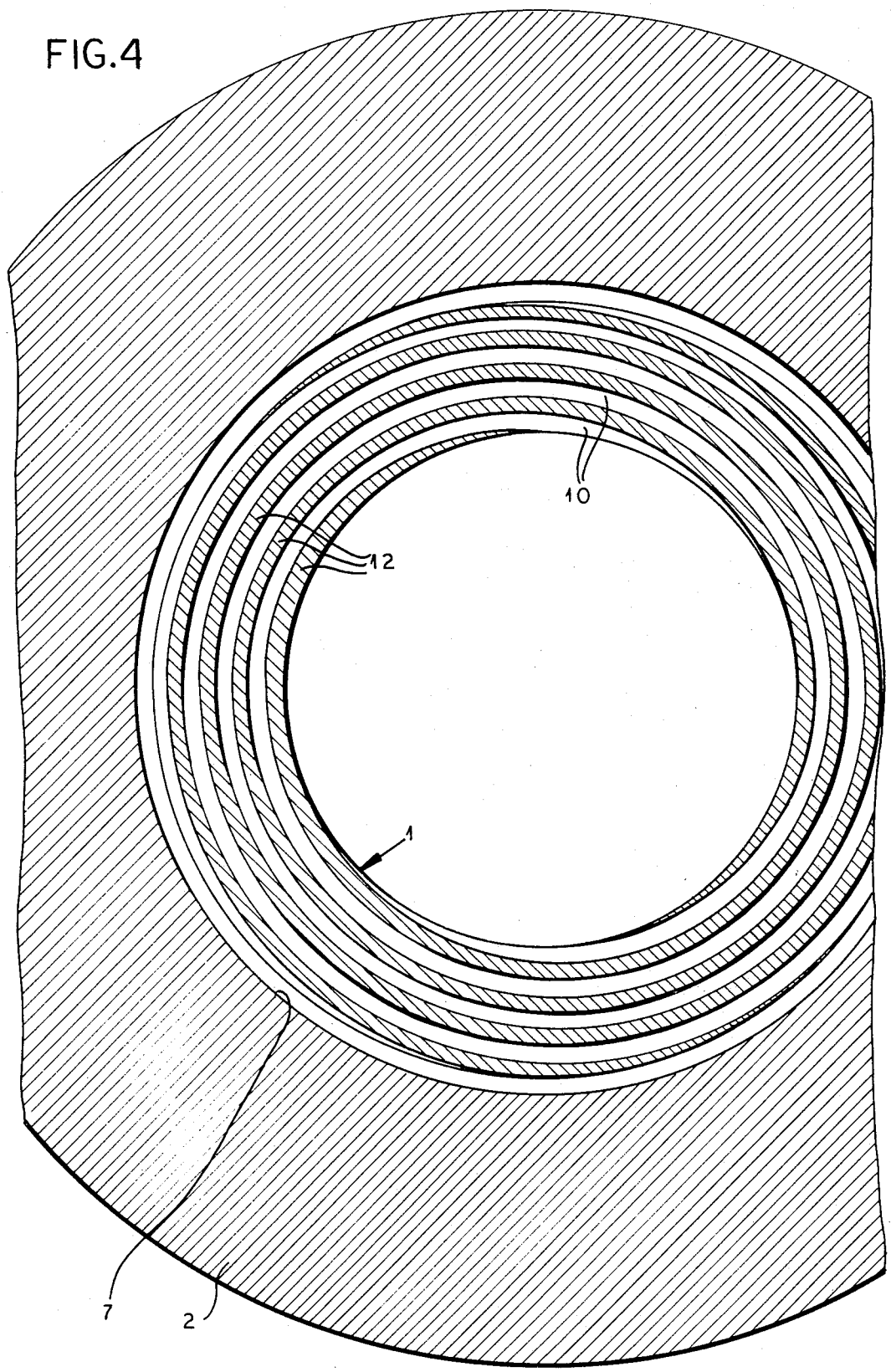
FIG. 4 is a cross-sectional view (partly broken away) taken on the line IV—IV of FIG. 3 and drawn to approximately the same scale.

In accordance with my present invention, and as best seen in FIGS. 2-4, shoulder 5 and face 6 are provided with generally spiral tracks defined in the first instance by ribs 9 with intervening grooves 11 and in the second instance by grooves 10 with intervening ribs 12. Ribs 9, projecting from shoulder 5, and grooves 10, recessed into face 6, have trapezoidal profiles with outer flanks 9b and 10b parallel to the common axis O (FIG. 1) of the interfitted pipes, these flanks being closely juxtaposed (possibly with an intervening oil film but preferably in metal-to-metal contact with one another) in the terminal position of FIGS. 1 and 2. In the same terminal position, tops 9a of ribs 9 abut bottoms 10a and grooves 10 while the tops of ribs 12, lying in the plane of face 6, similarly abut the bottoms of grooves 11 which lie in the plane of shoulder 5. These planes, like those of rib tops 9a and groove bottoms 10a, are all transverse to axis O.

As will be apparent from FIG. 4, the spiral track of end face 6 has two interleaved ribs 12 defining a double spiral thread. The same applies, of course, to the ribs 9 defining the spiral track of shoulder 5. The pitch of these spiral tracks is so chosen that counterclockwise rotation of plug 1 (as viewed in FIG. 4) relative to socket 2, serving to screw the plug into the socket, tends to expand the free end of the plug radially once the axially extending flanks 9b and 10b of their profiles have come into mutual contact. Initially, as seen in FIG. 3, these flanks are relatively offset by a radial distance corresponding to a differential $D_r$ of the inner radii $r_1$, $r_2$ of extremities 1 and 2. This differential is eliminated in the terminal position of FIG. 2 so that the inner wall surfaces of the two pipes are flush with each other, thanks to the interaction of frustoconical zone 7 with convex zone 8 tending to compress the plug end as discussed above. It will also be noted that the sloping inner flanks 9c and 10c of the trapezoidal rib and groove profiles are separated from each other by a small clearance in the fully assembled position; this clearance, while not absolutely essential, facilitates the interfitting of the two spiral tracks.

It will be understood that the multithread track shown in FIG. 4 could be replaced by one of the single-thread type having only one spiral rib 12 wound in several turns; the confronting track or shoulder 5 would then be similarly modified.

Given the small overall radial dimensions of shoulder 5 and face 6 referred to above, the interplay of the mutually opposite radial forces will not significantly deform the free end of plug 1—aside from eliminating the aforementioned radial differential $D_r$—so that the aligned inner wall surfaces of the two pipe extremities will still be cylindrical for practical purposes.

In conclusion it may be pointed out that the assembled pipe extremities, as shown in FIG. 2, sealingly contact each other in a number of distinct annular regions, namely between zones 7 and 8, at profile flanks 9b and 10b, between the tops of ribs 9 and the bottoms of grooves 10, and between the tops of ribs 12 and the bottoms of grooves 11. At least the first of these contacts will be of the metal-to-metal type so that a tight seal is assured even if an oil film should intervene in one or more of the other contact areas. With proper dimensioning of the rib and groove profiles, however, metal-to-metal contact could be obtained in all instances.

While tubular members 3 and 13 of FIG. 1 may both be full-length pipe sections with male and/or female extremities on opposite ends, pipe 13 could be reduced to a short sleeve with oppositely pointing sockets separated by a narrow annular shoulder as shown in the aforementioned German utility model No. 1,906,009.

I claim:

1. In combination, a first and a second metallic tubular member adapted to be coaxially interfitted in a fluid-tight manner, said first member having a plug-shaped extremity with an outer peripheral surface converging generally frustoconically toward a transverse annular end face thereof, said outer surface being provided with male helicoidal threads separated from said end face by a first unthreaded zone, said end face being formed with a first spiral track, said second member having a socket-shaped extremity with an inner peripheral surface diverging generally frustoconically from a transverse inner annular shoulder toward an entrance end thereof, said inner surface being provided with female helicoidal threads separated from said shoulder by a second unthreaded zone and matingly engageable by said male helicoidal threads upon insertion of said plug-shaped extremity into said entrance end, said annular shoulder having an inner diameter substantially equaling that of said end face and being provided with a second spiral track generally complementary to said first spiral track for mating engagement therewith upon said end face approaching said shoulder, said first and second spiral tracks being of a pitch tending to expand said first unthreaded zone radially into close contact with said second unthreaded zone upon relative rotation of said extremities into a terminal relative position of interengagement.

2. The combination defined in claim 1 wherein said first unthreaded zone is an annular bulge, said second unthreaded zone being substantially frustoconical.

3. The combination defined in claim 1 wherein each of said spiral tracks means is a multiple thread.

4. The combination defined in claim 1 wherein each of said spiral tracks comprises at least one axially projecting multiturn spiral rib receivable with small clearance in a multiturn spiral groove of the other track.

5. The combination defined in claim 4 wherein said rib and said groove have profiles with axially extending outer flanks closely juxtaposed in said terminal position.

6. The combination defined in claim 5 wherein said rib has a top coming to rest on the bottom of said groove in said terminal position.

7. The combination defined in claim 5 wherein said profiles are substantially trapezoidal with inner flanks diverging from said outer flanks.

8. The combination defined in claim 7 wherein the inner flanks of the rib and groove are slightly separated from each other in said terminal position.

* * * * *